United States Patent
Barnardo et al.

(10) Patent No.: US 8,058,975 B2
(45) Date of Patent: Nov. 15, 2011

(54) REMOTE CONTROL DEVICE, IN PARTICULAR A WAND HAVING MOTION DETECTION

(75) Inventors: Chrisopher John Andew Barnardo, Hertfordshire (GB); Richard Guy Blakesley, Cambridgeshire (GB)

(73) Assignee: The Wand Company Limited, Bishop's Stortford, Hertfordshire (GB)

( * ) Notice: Subject to any disclaimer, the term of this patent is extended or adjusted under 35 U.S.C. 154(b) by 0 days.

(21) Appl. No.: 12/617,095

(22) Filed: Nov. 12, 2009

(65) Prior Publication Data

US 2010/0134308 A1    Jun. 3, 2010

(30) Foreign Application Priority Data

Nov. 12, 2008 (GB) .................................... 0820621.1
Apr. 23, 2009 (GB) .................................... 0907014.5

(51) Int. Cl.
 G08B 21/00  (2006.01)
(52) U.S. Cl. ...................................... 340/12.3; 348/734
(58) Field of Classification Search .................. 340/670, 340/825.69, 825.72, 12.3, 12.53; 341/20, 341/173, 176; 348/552, 553, 734
See application file for complete search history.

(56) References Cited

U.S. PATENT DOCUMENTS

| | | | |
|---|---|---|---|
| 6,072,467 A | 6/2000 | Walker | |
| 6,346,891 B1 * | 2/2002 | Feinleib et al. | 340/12.3 |
| 2007/0033012 A1 | 2/2007 | Rosenberg | |
| 2007/0275755 A1 | 11/2007 | Chae et al. | |
| 2008/0318679 A1 | 12/2008 | Tran et al. | |

FOREIGN PATENT DOCUMENTS

| | | |
|---|---|---|
| JP | 2008042748 A | 2/2008 |
| JP | 2008173210 A | 7/2008 |
| WO | 2006098299 A1 | 9/2006 |
| WO | 2007060287 A1 | 5/2007 |
| WO | 2009073299 A1 | 6/2009 |

OTHER PUBLICATIONS

UK Intellectual Property Office Search Report dated Aug. 28, 2009 for Application No. GB0907014.5.

* cited by examiner

*Primary Examiner* — Jeffery Hofsass
(74) *Attorney, Agent, or Firm* — Colin P. Cahoon; Celina M. Orr; Carstens & Cahoon, LLP (57) ABSTRACT

An infrared remote control is encapsulated in a plastic moulding and has no physical controlling buttons or virtual touch screen buttons that uses motion to determine which remote control codes are to be transmitted to adjust the function of home audio visual equipment. The combination of a motion sensor (14) and a computer program running in an onboard microprocessor (15) enables the device to be used in any orientation. The user selects modes and causes the remote control device to broadcast infrared command signals as required to adjust the function of home audiovisual equipment at a distance by moving the device in certain predetermined patterns. The device signals its function to the user by a heartbeat style vibration pattern.

20 Claims, 4 Drawing Sheets

FIG. 5

REMOTE CONTROL DEVICE, IN PARTICULAR A WAND HAVING MOTION DETECTION

FIELD OF THE INVENTION

This invention concerns a wireless, e.g. infrared, universal remote control device, in particular for use in the home for the wireless control of audio visual home entertainment equipment, and in preferred embodiments where the components are encapsulated in a cylindrical block or tube of plastic, so as to create an essentially solid state device where there are very few moving parts, in the shape of a magic wand.

BACKGROUND OF THE INVENTION

Wireless infrared remote controls are known comprising a hand held transmitter which when coupled with a receiver in the corresponding piece of audiovisual equipment, enables a user to control the various functions of the said audiovisual equipment at a distance without having to approach or touch the audiovisual equipment. Typically a remote control device consists of a housing which houses electronics, one or more batteries, an interface comprising one or more buttons, in some cases a display with or without touch sensitive areas which relate to the functions to be controlled and one or two infrared transmitter light emitting diodes (LEDs). In normal operation, when the user wishes to alter the settings of a piece of audiovisual equipment at a distance, then in normal operation when one of the remote control buttons is depressed, or the touch sensitive surface is touched, the electronics of the device causes a coded signal to be broadcast by the remote control device, using flashes of infrared light, which is then received by the audiovisual equipment being controlled, the receipt of which triggers electronics within the audiovisual equipment to perform the desired function. Typically wireless remote controls are used to change the settings of audiovisual equipment, such as; channel (in the case of a television or digital broadcast receiver for example), or track number (in the case of audio equipment or a DVD player for example) without having to approach the equipment. Wireless remote controls may also be used to supplement the main controls of any piece of audiovisual equipment to enable the settings of the device to be changed where it is not possible or practical to put large numbers of buttons or a control interface on the piece of audiovisual equipment itself.

Wand shaped remote wireless controlling devices are also known for use in computer video game interaction, as in earlier published International Patent Application No. WO9728864. In that patent, a wand shaped remote is described for use in conjunction with a personal computer, to enable more immersive role playing with computer games featuring virtual wands. The described device uses a mixture of buttons and movement to facilitate control of the game.

Further hand held wireless mouse devices are also known for controlling personal computers to enable presenters to control their computers while standing up, giving presentations, as in earlier U.S. Pat. No. 7,158,118 Pointing Devices with Orientation Compensation.

However, these known arrangements suffer from the problem that none of them is adapted or has the capability either to function purely by motion and without the use of any buttons to control audiovisual home entertainment equipment, or to be completely encapsulated in a tube or a solid casting of plastic so that small and non-traditional device shapes may be accommodated, in turn so that the remote control may have a shape simulating other objects, in particular an elongate object, such as a wand, which does not have the conventional appearance of a generic remote control device incorporating manually operable control buttons.

SUMMARY OF THE INVENTION

The present invention aims to provide a remote control device which overcomes these problems known to remote control devices.

Accordingly, the present invention provides a wireless remote control device for remotely controlling an apparatus, the remote control device comprising:

a motion sensor for detecting movement of the device and to generate an output signal in response to the detected movement, a processor connected to the motion sensor and adapted to receive the output signal from the motion sensor and to generate therefrom a control signal associated with the detected movement, and an emitter connected to the processor for receiving the control signal and emitting a wireless signal for reception by a receiver in the apparatus to be controlled.

Preferably, the motion sensor is adapted to detect movement of the device in three dimensional space, the output signal being associated with the movement.

Preferably, the device further comprises a memory for storing data representing a plurality of preset movements, each preset movement being associated with a respective command or function corresponding with a respective control signal, and the processor includes a comparator which is adapted to compare the detected movement to the plurality of preset movements and a controller to determine parameters of the control signal based on the comparison whereby the control signal generated is associated with the respective command or function.

More preferably, the preset movements correspond to at least one of pictograms and alphanumeric characters.

Optionally, the processor is adapted to determine an initial movement of the motion sensor after a period of inactivity and, in response thereto, to switch the device from a sleep mode into an active control mode.

Preferably, the motion sensor is adapted to detect an impact on the device and the processor is adapted to convert the output signal thereby generated into a respective control signal.

Typically, the motion sensor is adapted to detect the impact of a tap of a human finger on the device.

In one preferred embodiment, the motion sensor is adapted to determine an orientation of the device with respect to vertical and horizontal axes and the processor is adapted to calibrate the detected movement with respect to the determined orientation.

Preferably, the motion sensor is adapted to determine the orientation of the device on receipt of an impact or following an initial movement of the motion sensor after a period of inactivity.

Preferably, the motion sensor is adapted to detect an inclination of the device with respect to at least one of a horizontal axis and a vertical axis and to increase or decrease a value of a setting represented by the wireless signal in response to corresponding modification of the inclination of the device.

Optionally, the processor is adapted to be switched into a learning mode upon receipt of a predetermined output signal or a predetermined sequence of output signals from the motion sensor.

In a preferred embodiment, the wireless remote control device further comprises a receiver for receiving wireless coded signals from the original equipment remote control of the apparatus to be controlled, and the processor is adapted to convert the coded signals into operational codes or instructions associated with the apparatus to be controlled.

Typically, the wireless remote control device is a handheld device and further comprises a vibration element coupled to the processor and adapted to vibrate on receipt of a vibration signal from the processor to provide mechanical feedback of the operation of the device to a user.

Preferably, the processor is adapted to send a sequence of vibration signals to the vibration element, the sequence being preset in time to mimic a human heartbeat.

In a preferred embodiment, the vibration element consists of the sole element in the device for continually communicating information concerning the operation of the device to a user holding the device.

In a particularly preferred embodiment, the motion sensor consists of the sole user interface for controlling the device.

In an alternative preferred embodiment, the wireless remote control device further comprises a manually operable ON/OFF switch for the device.

Most typically, the device is encapsulated within an elongate housing in the form of a rod, the emitter being located at one end of the housing. The elongate housing may be shaped and dimensioned to simulate a wand.

In most preferred embodiments, the elongate housing has no external display or switch, except when the device further comprises a manually operable ON/OFF switch.

Typically, the emitter is adapted to emit electromagnetic radiation in the infrared region of the electromagnetic spectrum.

In a most preferred embodiment, the device is adapted to control audiovisual apparatus.

The present invention also provides a method of remotely controlling audiovisual apparatus using a wireless remote control device, the method comprising:

manually holding a remote control device having a motion sensor for detecting movement of the device in three dimensional space, and moving the device in three dimensional space automatically to emit from the device an encoded wireless control signal which is received by the audiovisual apparatus.

Preferably, the motion sensor detects movement of the device in three dimensional space.

Preferably, the motion sensor outputs an output signal associated with the movement, and the device compares the detected movement to a plurality of preset movements, each preset movement being associated with a respective command or function of the audiovisual apparatus, and determines parameters of the control signal based on the comparison whereby the control signal emitted is associated with the respective command or function.

More preferably, the preset movements correspond to at least one of pictograms and alphanumeric characters.

Optionally, the method further comprises the step of automatically switching the device from a sleep mode into an active control mode in response to an initial movement of the motion sensor after a period of inactivity.

Optionally, the method further comprises the step of detecting an impact on the motion sensor and, in response thereto, automatically emitting a respective encoded wireless control signal. The impact may be a tap of a human finger on the device.

Typically, the motion sensor determines an orientation of the device with respect to vertical and horizontal axes and the method further comprises the step of calibrating the detected movement with respect to the determined orientation.

Preferably, the orientation of the device is determined on receipt of an impact or following an initial movement of the motion sensor after a period of inactivity.

In a preferred embodiment, the motion sensor detects an inclination of the device with respect to at least one of a horizontal axis and a vertical axis and the method further comprises a step of modifying the inclination of the device correspondingly to increase or decrease a value of a setting represented by the encoded wireless signal.

The method may further comprise the step of switching the device into a learning mode upon receipt of a predetermined output signal or predetermined sequence of output signals from the motion sensor.

In a preferred embodiment, the method further comprises the steps of receiving wireless coded signals from the original equipment remote control of the apparatus to be controlled, and converting the coded signals into operational codes or instructions associated with the apparatus to be controlled.

Optionally, the method further comprises the step of providing mechanical feedback of the operation of the device by vibrating a vibration element located in the device. Preferably, the vibration element vibrates in a sequence which is preset in time to mimic a human heartbeat.

In a preferred embodiment, the vibration element consists of the sole element in the device for continually communicating the operation of the device to a user holding the device.

In a particularly preferred embodiment, the motion sensor consists of the sole user interface for controlling the device.

Typically, the device is encapsulated within an elongate housing, the emitter being located at one end of the housing. Preferably, the elongate housing is shaped and dimensioned to simulate a wand.

Typically, the emitter emits electromagnetic radiation in the infrared region of the electromagnetic spectrum.

The present invention also provides a wireless infrared remote control with no physical buttons or virtual touch screen buttons that uses motion to adjust the function of home audio visual equipment.

The present invention also provides a wireless remote control device with no physical control buttons or virtual touch screen buttons that uses motion to adjust the function of home audio visual equipment that has a single button for turning the device on.

The present invention also provides a wireless remote control device that uses pulsed vibration to signify various modes or operational states.

The present invention also provides a wireless remote control device that uses pulsed vibration mimicking a heartbeat to signify various modes or operational states.

The present invention also provides a wireless remote control that uses the recognition of predetermined motions to determine which of a closed set of discrete pre-learned infrared control codes to broadcast.

The present invention also provides a wireless remote control that is motion sensitive and uses the action of gravity to calibrate its motion sensing and apply an algorithm which in combination with its onboard program allows the device to be used in any orientation.

The present invention also provides a wireless infrared remote control shaped like a wand with no physical buttons or virtual touch screen buttons that uses motion to adjust the function of home audio visual equipment.

The present invention also provides a wireless infrared remote control shaped like a wand that is housed in one or more case parts that are glued together to appear as one piece so that the electronics and battery compartment are encapsulated in plastic and there are no external moving parts.

The present invention also provides a wireless infrared remote control shaped like a wand that using an onboard microcontroller and accelerometer can determine functions and commands from pictograms drawn by the user in the air using the tip of the wand.

The present invention also provides a wireless infrared remote control shaped like a wand that using an onboard microcontroller and accelerometer can determine functions and commands from alpha numeric letters and numbers drawn by the user in the air using the tip of the wand.

The present invention also provides a wireless infrared remote control shaped like a wand that using an onboard microcontroller and accelerometer can determine functions and commands from pictograms and or alpha numeric letters and numbers drawn by the user in the air using the tip of the wand regardless of its orientation.

The present invention also provides a wireless infrared remote control shaped like a wand that using an onboard microcontroller and accelerometer can determine functions and commands from pictograms and or alpha numeric letters and numbers drawn by the user in the air using the tip of the wand, where the orientation of the device is first determined by the user taping their finger on the surface of the device.

The present invention also provides a wireless infrared remote control shaped like a wand that using an onboard microcontroller and accelerometer can determine functions and commands from pictograms and or alpha numeric letters and numbers drawn by the user in the air using the tip of the wand, where the orientation of the device is first determined by the action of the user picking up the device.

The present invention also provides a wireless infrared remote control shaped like a wand that using an onboard microcontroller and accelerometer can determine the command function to increase or decrease a given setting by its inclination, once its orientation has been determined.

The preferred embodiments of the present invention can provide a realistic looking remote control wand that is constructed in one piece, such that the user may use it to wirelessly control the functions of various pieces of audio visual equipment, without the use of buttons, solely by describing particular prescribed motions in the air.

The preferred embodiments of the present invention can also provide by the means of the combination of a sensor for detecting motion, an integrated computer programme for interpreting detected said motion and a microprocessor for running said programme, to convert discrete and purposeful movements of the wand into bursts of broadcast infrared light that can be received and interpreted as remote control commands by a second, remote device.

The present invention also provides a wireless remote control device for remotely controlling an audiovisual apparatus, the remote control device comprising:

a motion sensor for detecting movement of the device in plural directions and to generate an output signal in response to the detected movement, a processor connected to the motion sensor and adapted to receive the output signal from the motion sensor, to determine a relationship between the detected movement represented by the output signal and one of a plurality of discrete preset movements each of which is associated with a respective command or function to be communicated to the audiovisual apparatus, to select a command or function to be communicated to the audiovisual apparatus based on such determination and to generate therefrom a control signal for implementing such a command or function which corresponds to the detected movement, and an emitter connected to the processor for receiving the control signal and emitting a wireless signal for reception by a receiver in the audiovisual apparatus to be controlled.

Preferably, the motion sensor is adapted to detect movement of the device in three dimensional space represented by three orthogonal directions.

Preferably, the motion sensor is adapted to detect acceleration of the device each of three orthogonal directions.

Preferably, the device further comprises a memory for storing data representing a plurality of the preset movements, and the processor includes a comparator which is adapted to compare the detected movement to the plurality of preset movements and a controller to determine parameters of the control signal based on the comparison whereby the control signal generated is associated with the respective command or function.

Preferably, the preset movements correspond to at least one of pictograms and alphanumeric characters.

The preferred embodiments of the present invention can determine the function of, and commands broadcast by, the remote control device by the sole means of drawing in the air with the tip of the device, pictograms relating to the desired function, whereby if the user wishes to change channel of the television they are remotely controlling, then, for example, they might first draw a picture of a capital letter C in the air to set the remote control in "Channel Change Mode" and then immediately afterwards incline the wand either up or down depending on whether they want the television to change up or down a channel. In another embodiment, again for example, the user would draw a capital letter C in the air to set the remote control in "Channel Change Mode" and then immediately afterwards draw in the air the number of channel to which they want the television to change.

The preferred embodiments of the present invention can further provide a remote control device permitting the components to be miniaturised and to be completely encased in a plastic housing so that their shape may be disguised.

The preferred embodiments of the present invention can yet further provide an electronic device in the shape of a wand, which is predominantly all in one piece, with only one small removable part to enable battery changing.

The preferred embodiments of the present invention can further provide a wireless remote control device with a new and unique interface where there are no buttons, or touch sensitive displays on the device.

In summary, the particularly preferred embodiments of the present invention can further provide a remote control which to all intents and purposes looks and feels like a thin wooden wand with greatly improved aesthetics, which reduces the obviousness of the infrared wireless remote control technology and introduces more fun into the remote controlling of home audio equipment.

The standard operation and electronic construction of a wireless infrared remote control has been described in previous literature and so won't be described here.

BRIEF DESCRIPTION OF THE DRAWINGS

The present invention will be described further, by way of example, with reference to the accompanying drawings, in which.

DETAILED DESCRIPTION OF THE PREFERRED EMBODIMENTS OF THE INVENTION

Figure 1:
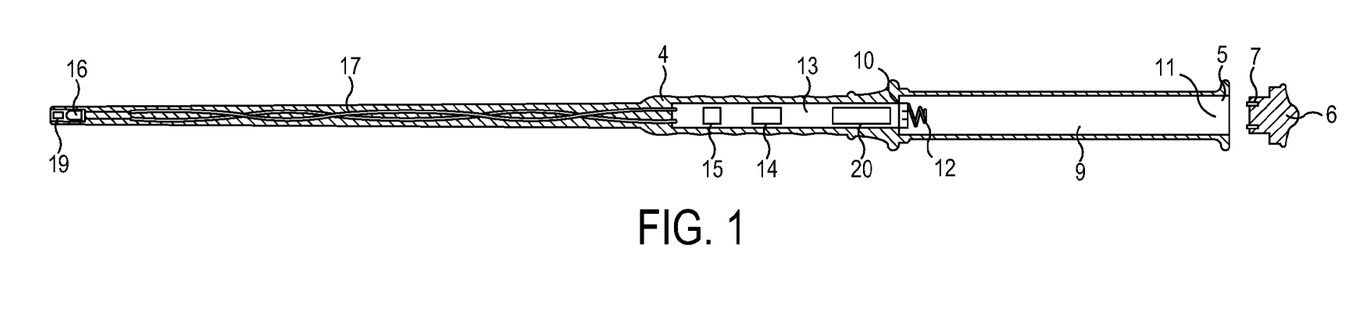
FIG. 1 is a representative cross section of the device showing each major component.
Figure 2:
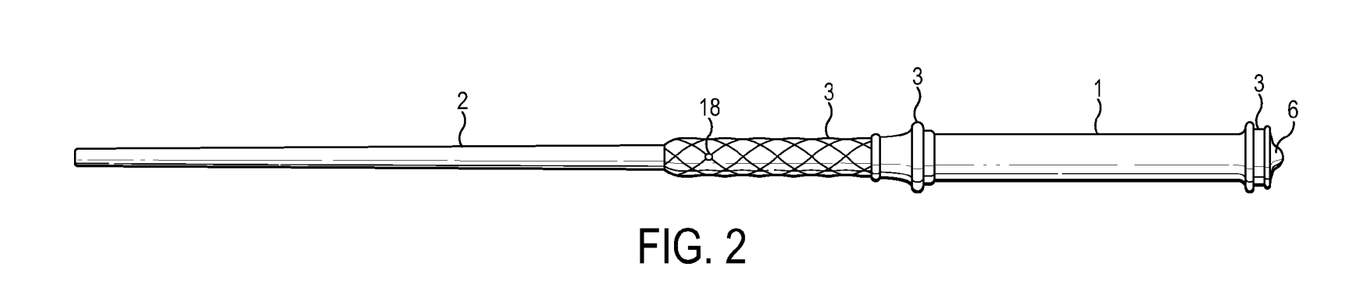
FIG. 2 is a representation of the typical form of appearance the device might take.
Figure 5:
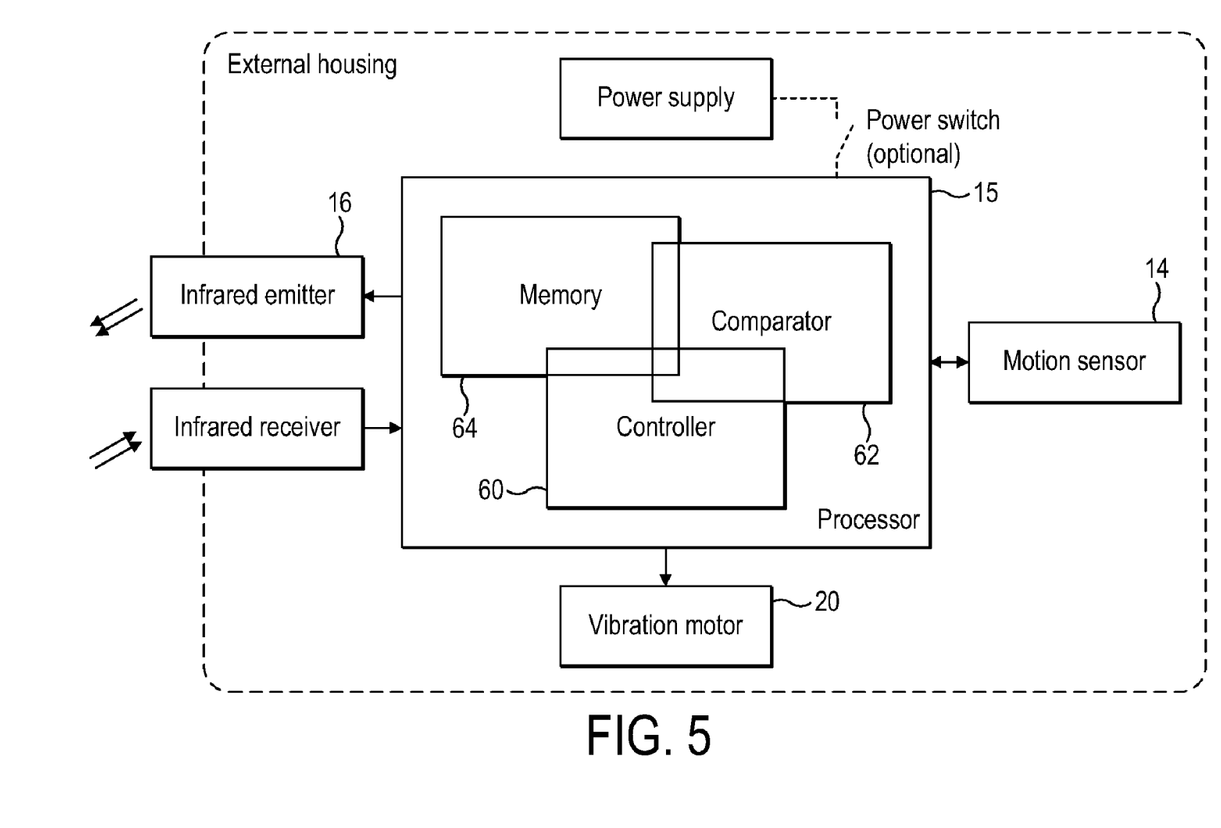
FIG. 5 is a block diagram showing the key components of the invention.

Referring to the drawings, in particular FIGS. 1, 2 and 5, the device is typically long and thin with a handle portion at one end (1) and long tapering element at the other (2) which is typically thinner in cross section than the handle portion. Around the handle portion and between the handle and the tapering portion there are various decorative embellishments designed to enhance the appearance (3). The remote control external housing may be constructed from thermoplastic injection moulded plastic, machined wood, solid resin, plastic casting or low pressure, low temperature reaction injection moulded (RIM) Poly-urethane (PU) (4), for example, cast around the electronic components so as to completely encapsulate them (with the exception of the battery compartment, which has one open end (5) closed by a screw or bayonet fitted end cap (6)).

In one embodiment of the invention, the infrared (IR) LED (16) is held in a retainer during the moulding process so that its tip is exposed.

In another embodiment of the invention, the IR LED is completely encapsulated in a dark plastic resin that is transparent to infrared light but a dark filter for visible light so that the LED is completely hidden from sight. In yet another embodiment the IR LED is fitted in to a close fitting hollow tube and covered by a small IR transmissive plastic plug (19) that hides it from sight, while allowing it to function normally.

The batteries are housed in a snugly fitting metal tube (9), which is open at one end (5) and the batteries are electrically connected to the electronic circuit via a printed circuit board (PCB) connection (10) and a spring (12). The open end of the battery case is closed by a decorative metal closure (6) that via a screw thread (5) makes contact with the metal tube (9) that is connected to the PCB. The batteries are arranged in series and the positive terminal of the one battery is pressed against the metal closure (6), while the negative terminal of the other battery is pressed against the spring (12) which is attached to the PCB (13) which thereby provides a power circuit and thus power to the PCB electronics. A circular nonconductive insert spacer (7) ensures that if the batteries are inserted incorrectly (that is, with the negative and positive polarity reversed, the negative terminal of the battery is not able to touch the metal closure and complete the electrical circuit, thereby preventing a reverse polarity electrical circuit being made and damaging the electronics. The electronics circuit comprises a PCB (13), a solid state 3 axis motion sensor (14), an infrared emitter/receiver LED (16), a vibration motor (20), an integrated circuit (IC) microprocessor (15), and a number of other minor peripheral components necessary for the amplification of the transmitted and received infrared signals and the general operation of the major electronic components, such that in operation, any motion of the device is detected by the motion sensor (14), converted by the motion sensor into an electrical signal which passes to the microprocessor (15) which is then processed and measured to determine the nature of the movement via an internal program. The motion sensor (14) can detect movement in three dimensional space, defined by the x, y, z coordinates, and the microprocessor can process that signal, or successive signals, so as to record plural spatial positions, acceleration and movement between such spatial positions, with respect to distance, direction and/or time parameters, of the motion sensor, and consequently the remote control device. In particular, the motion sensor can detect acceleration in one or more orthogonal directions and the processor can determine therefrom movement, optionally with respect to time, in those directions. The microprocessor (16) includes a controller (60), a comparator (62) and a memory (64). The electrical signal from the motion sensor (14) representing the detected movement is compared by comparator (62) with a number of pre-programmed movements stored as data in the memory (64) of the microprocessor, each preset movement being associated with a respective command or function to be communicated by a respective wireless signal to the equipment to be controlled. Each preset movement may have distance, direction and/or time parameters and may comprise two or more locations in three dimensional space, represented by x, y, z coordinates, optionally with a time parameter representing speed and/or acceleration between those locations. If it is recognised as one of the predetermined movements that correlates with a particular remote control command sequence, then the controller (60), based on the comparison, determines parameters of the respective control signal to be generated by the microprocessor which in turn determines the parameters of the wireless signal to be emitted, and the microprocessor generates a control signal which causes the infrared LED (16) to send a wireless signal comprising a burst of infrared flashes in the exact command sequence that corresponds to controlling code required by the receiving equipment in order for it to perform the desired function. To enable the wand's slender appearance, the LED (16) is joined to the PCB (13) by two flying leads (17) so that the infrared emitter may be located at some distance from the PCB, say, at the tip of the wand. In another embodiment, a thin strip of PCB to which the LED can be directly soldered may extend to the tip of the wand, and remove the need for the flying leads. The device may also have a small marking or LED (18) component to help the user orientate the device correctly prior to, and during use.

Figure 3:
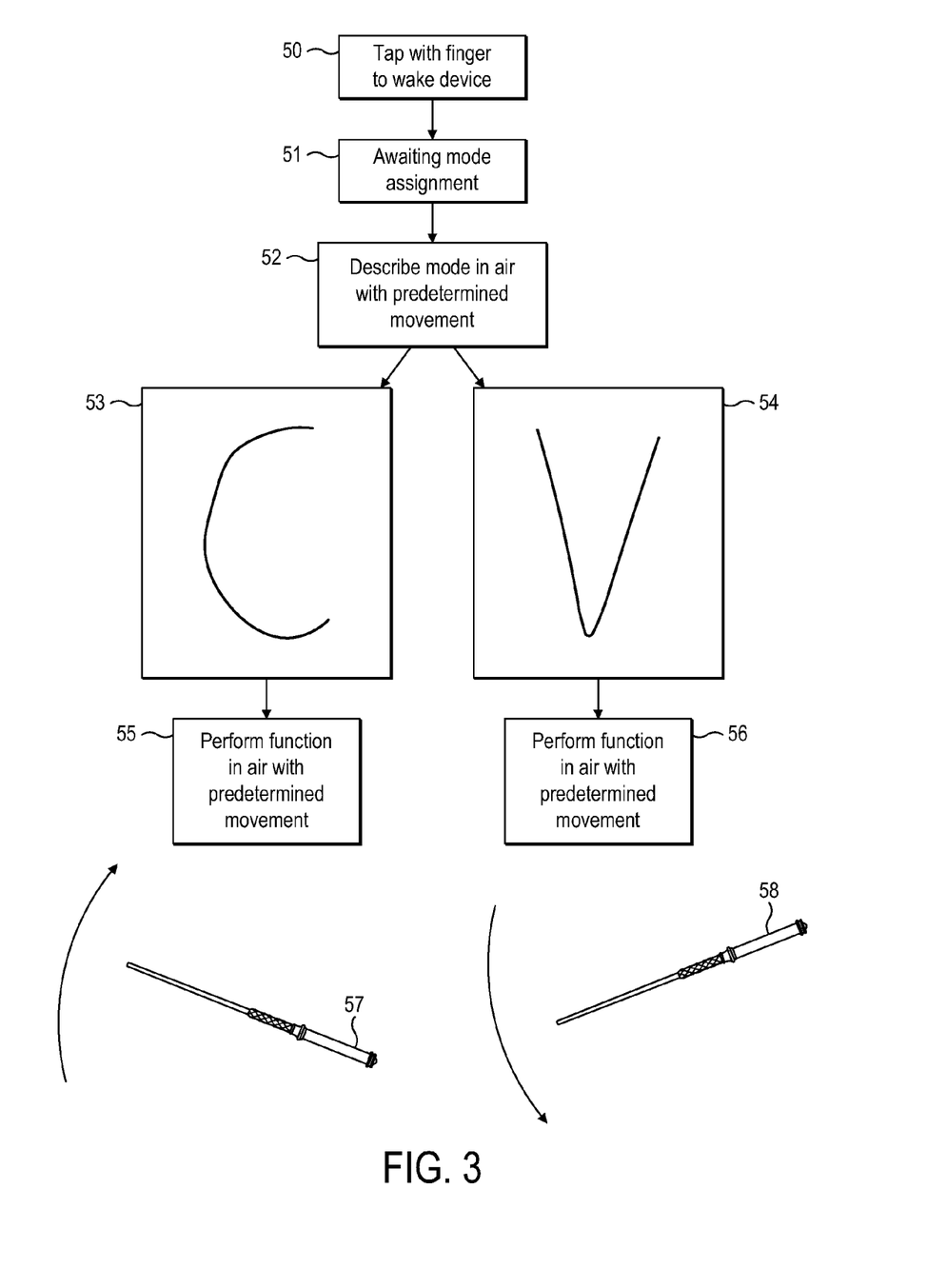
FIG. 3 is a flow chart showing a typical usage scenario.

The usage of the device can be best described referring to FIG. 3. In normal usage the remote control is picked up by the user and held by the handle in one hand, with the tip pointing towards the piece of audiovisual equipment to be controlled, making sure that the wand is in the upright position by reference to the small mark or LED light (18).

In one embodiment the user gently taps the wand with their finger twice (50), to wake the wand up and set it in to "Awaiting Mode Assignment" (51). Immediately afterwards, the user then uses the wand remote to describe the predetermined shape in the air with the tip of the wand, to set the functional Mode as required, for example, (but not limited to) the letter of the desired function, such as capital C for channel (53) or V for volume (54), or any other predetermined series of easily learnable and identifiable movements. Once the Mode has been set, then immediately following the mode setting, the user inclines the wand up (57), to increase the particular function (55) on the equipment being controlled or inclines the wand down (58) to reduce the particular function (56) on the equipment being controlled.

In another embodiment the user does not need to orientate the wand, the initial double finger tap calibrates the wand's immediate orientation and the microcontroller's programme then takes the orientation into account when assessing the wand movements against the predetermined library of movements.

In another embodiment of the invention, the user picks up the wand and does not perform the finger tap or the orientation. In this embodiment, the mode setting pictogram shapes or patterns chosen at the manufacturing stage are those that are recognisable regardless of the device's initial orientation for example (but not limited to) a square, triangle and or circle. In this case, the action of moving the wand when the user picks it up wakes up the device and sets it in "Awaiting Mode Assignment" (23) mode.

In yet another embodiment of the invention, the user picks up the wand and does not perform the finger tap or any other deliberate orientation procedure. In this embodiment, the simple action of the user picking up the device enables the device to determine the orientation of the device. Using a accelerometer capable of detecting and measuring motion in three axes determines, the direction of travel during the picking up event is detected and the microprocessor uses this information to determine the user's orientation and then apply a correction algorithm to the subsequent movements made by the wand during that usage session, such that when the user draws pictograms in the air or inclines the device either up or down, the device is able to interpret them correctly.

In yet another embodiment of the invention, the wand automatically determines its initial orientation using gravitational acceleration data recorded while at rest enabling the wand to compensate for its initial orientation and apply a correction algorithm to all recorded motion sensing data in real time so that the user need not consider the initial orientation of the wand during use, regardless of how it was orientated to start with, such that when the user draws pictograms in the air or inclines the device either up or down or performs control actions such as flick to the left and right or flick up and flick down, the device is able to interpret them correctly regardless of its initial orientation.

Where there are a number of universal remote control codes stored inside the microcontroller's memory, a similar sequence of finger taps and predetermined movements may be employed to cause the wand to be in a set up mode, where the necessary operational codes and commands can be selected from the device's onboard library for use with the user's particular brand of audiovisual equipment.

The device may also have the capability to learn the remote control codes and commands for controlling specific pieces of audiovisual equipment, where the necessary universal command codes are not already stored in the microcontroller. In such cases, a similar sequence of finger taps and predetermined movements may be employed to cause the wand to be in a learning mode, where the necessary operational codes and commands can be learned from an existing third party or original equipment manufacturer (OEM) remote control device as originally supplied with user's particular audiovisual equipment.

Learning remote sequences are not novel and have been described elsewhere so will not be described here in detail. Typically the remote will learn a new code in the following way. By a series of finger taps and wand movements, the user makes the wand go into learning mode. The third party remote control which has the original code is then placed so that it is pointing towards the tip of the present invention and the relevant button is pressed so that the third party remote is caused to broadcast the desired control code. The present invention detects the infrared flashes of the third party remote's LED either using its own infrared LED or another suitable photodiode and stores the sequence in its microprocessor. Once the learning has been completed the remote control wand terminates the learning mode and returns to its resting state.

Further the device may also have a training mode, where the predetermined movements are supplemented by movements of the user's own choosing.

Figure 4:
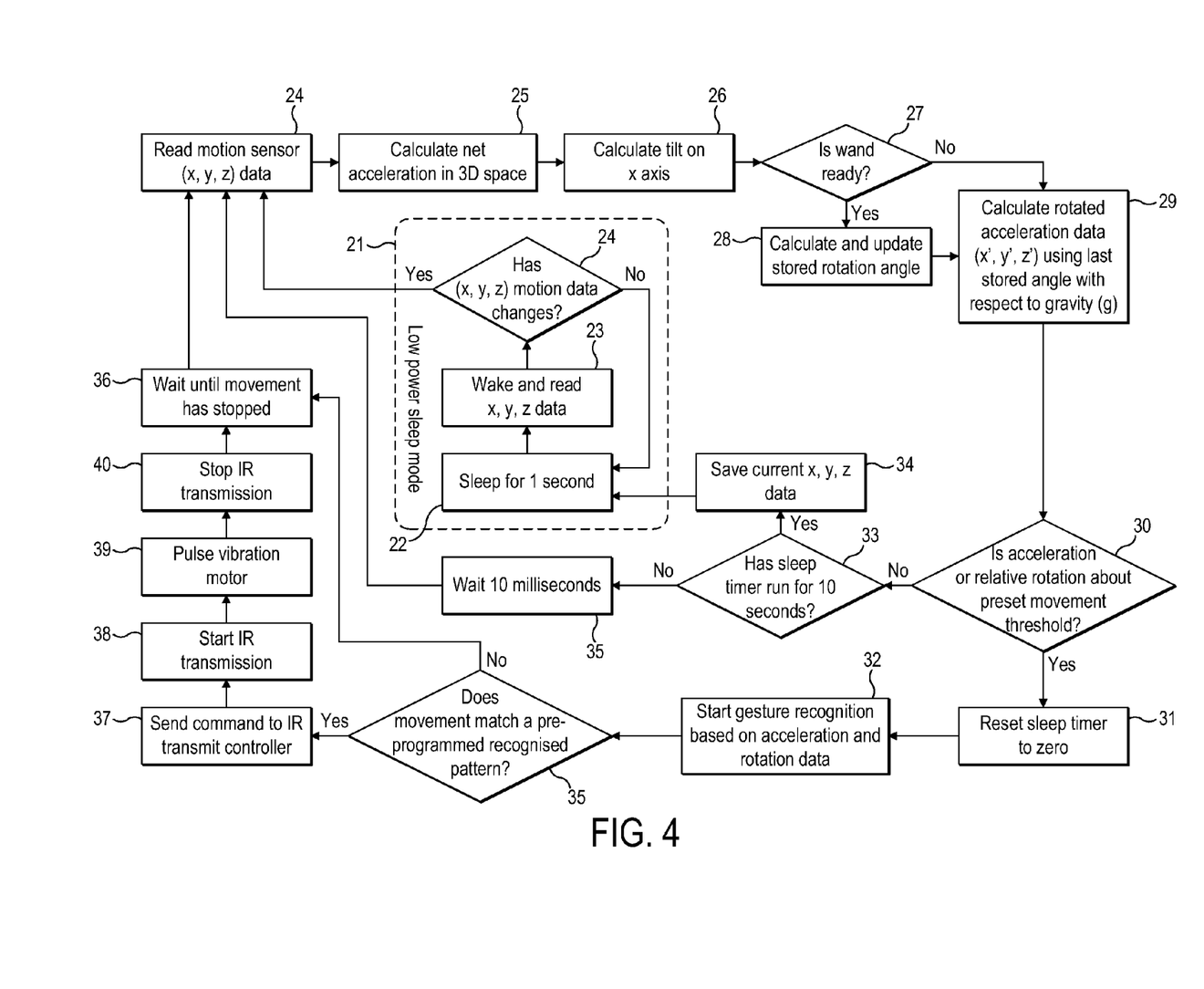
FIG. 4 is a flow chart showing the function of the invention.

The functioning of the wand can best be described by referring to FIG. No. 4.

Under normal conditions, when the wand is at rest, the wand is in a low power mode or sleep mode (21). In low power mode the wand microprocessor sleeps for a set period (say one second (22)) drawing very little current and then wakes up to a higher power state and reads the motion sensor data in the x, y and z axes (23). The microprocessor compares the x,y,z reading with the previous x,y,z reading (24). If no change is detected then the microprocessor goes back to sleep (22). If a change is detected between the reading and the previous reading, the microprocessor reads the motion sensor x,y,z data (24) and calculates the net acceleration in 3D space (25), calculates the tilt in the x axis (26) and determines if the wand is steady and level (27). If the wand is steady and level, then the microprocessor calculates and updates the stored rotation angle (28) and then calculates the rotated acceleration data (x',y',z') using the last stored angle with respect to gravity (29), if the wand isn't steady then it directly calculates the rotated acceleration data (x',y',z') using the last stored angle with respect to gravity (29). The microprocessor then checks if the acceleration or relative rotation is above a present movement threshold (30), if it is, then the microprocessor resets the sleep timer to zero (31) and begins gesture recognition algorithm (32). If the if the acceleration or relative rotation is not above a present movement threshold, the microprocessor checks to determine if the sleep timer has run for 10 seconds (33), if it has, then the microprocessor saves the current x, y, z data (34) and enters sleep mode (21). If the sleep timer has not run for 10 seconds, then the microprocessor reads the motion sensor (x,y,z) data (24) and once again calculates the net acceleration in 3D space (25) and repeats the cycle to determine whether or not the wand is being moved deliberately or should return to sleep mode.

Once the microprocessor is in gesture recognition mode, the microprocessor compares the net acceleration in 3D space with a bank of pre-programmed motion patterns to determine if the detected motion is a close match to one of the predetermined movement patterns (35). If the motion does not match any of the predetermined pre-programmed motion patterns, the microprocessor waits until the motion has ceased (36) and then the microprocessor reads the motion sensor (x,y,z) data (24) and once again calculates the net acceleration in 3D space (25) and repeats the cycle to determine whether or not the wand is being moved deliberately or should return to sleep mode. If the motion of the wand is a close match for any of the predetermined pre-programmed motion patterns, the microprocessor sends the command to the infrared transmit controller (37) that has been saved in the microprocessor memory corresponding to that particular motion. The infrared transmit controller then causes the infrared LED to start transmitting the infrared controlling code (38), and pulses the vibration motor (39). After a standard period of time, during which a burst of infrared radiation sufficient to be received by the third party electronic equipment being controlled, has been sent, the infrared transmit controller stops the LED sending the infrared signal (40). The microprocessor then waits until the motion has ceased (36) and then the microprocessor reads the motion sensor (x,y,z) data (24) and once again calculates the net acceleration in 3D space (25) and repeats the cycle to determine whether or not the wand is being moved deliberately or should return to sleep mode.

What is claimed is:

1. A wireless remote control device for remotely controlling an apparatus, the remote control device comprising:

a motion sensor for detecting movement of the device and to generate an output signal in response to the detected movement, a processor connected to the motion sensor and adapted to receive the output signal from the motion sensor and to generate therefrom a control signal associated with the detected movement, wherein the processor is adapted to determine an initial movement of the motion sensor after a period of inactivity and, in response thereto, to switch the device from a sleep mode into an active control mode, and an emitter connected to the processor for receiving the control signal and emitting a wireless signal for reception by a receiver in the apparatus to be controlled, wherein the motion sensor is adapted to detect an impact of a human finger on the device and the processor is adapted to convert the output signal thereby generated into a respective control signal.

2. A wireless remote control device according to claim 1 wherein the motion sensor is adapted to detect movement of the device in three dimensional space, the output signal being associated with the movement.

3. A wireless remote control device according to claim 1 wherein the device further comprises a memory for storing data representing a plurality of preset movements, each preset movement being associated with a respective command or function corresponding with a respective control signal, and the processor includes a comparator which is adapted to compare the detected movement to the plurality of preset movements and a controller to determine parameters of the control signal based on the comparison whereby the control signal generated is associated with the respective command or function.

4. A wireless remote control device according to claim 3 wherein the preset movements correspond to at least one of pictograms and alphanumeric characters.

5. A wireless remote control device according to claim 1 wherein the motion sensor is adapted to determine an orientation of the device with respect to vertical and horizontal axes and the processor is adapted to calibrate the detected movement with respect to the determined orientation.

6. A wireless remote control device according to claim 5 wherein the motion sensor is adapted to determine the orientation of the device on receipt of an impact or following an initial movement of the motion sensor after a period of inactivity.

7. A wireless remote control device according to claim 5 wherein the motion sensor is adapted to detect an inclination of the device with respect to at least one of a horizontal axis and a vertical axis and to increase or decrease a value of a setting represented by the wireless signal in response to corresponding modification of the inclination of the device.

8. A wireless remote control device according to claim 1 wherein the motion sensor consists of the sole user interface for controlling the device.

9. A wireless remote control device according to claim 1 further comprising a manually operable ON/OFF switch for the device.

10. A wireless remote control device according to claim 1 wherein the emitter is adapted to emit electromagnetic radiation in the infrared region of the electromagnetic spectrum.

11. A wireless remote control device according to claim 1 wherein the device is adapted to control audiovisual apparatus.

12. A method of remotely controlling audiovisual apparatus using a wireless remote control device, the method comprising:

manually holding a remote control device having a motion sensor for detecting movement of the device in three dimensional space, moving the device in three dimensional space automatically to emit from the device an encoded wireless control signal which is received by the audiovisual apparatus, automatically switching the device from a sleep mode into an active control mode in response to an initial movement of the motion sensor after a period of inactivity, and detecting an impact of a human finger on the motion sensor and, in response thereto, automatically emitting a respective encoded wireless control signal.

13. A method according to claim 12 wherein the motion sensor detects movement of the device in three dimensional space.

14. A method according to claim 12 wherein the motion sensor outputs an output signal associated with the movement, and the device compares the detected movement to a plurality of preset movements, each preset movement being associated with a respective command or function of the audiovisual apparatus, and determines parameters of the control signal based on the comparison whereby the control signal emitted is associated with the respective command or function.

15. A method according to claim 14 wherein the preset movements correspond to at least one of pictograms and alphanumeric characters.

16. A method according to claim 12 wherein the motion sensor determines an orientation of the device with respect to vertical and horizontal axes and further comprising the step of calibrating the detected movement with respect to the determined orientation.

17. A method according to claim 16 wherein the orientation of the device is determined on receipt of an impact or following an initial movement of the motion sensor after a period of inactivity.

18. A method according to claim 16 wherein the motion sensor detects an inclination of the device with respect to at least one of a horizontal axis and a vertical axis and further comprising a step of modifying the inclination of the device correspondingly to increase or decrease a value of a setting represented by the encoded wireless signal.

19. A method according to claim 12 wherein the motion sensor consists of the sole user interface for controlling the device.

20. A method according to claim 12 wherein the emitter emits electromagnetic radiation in the infrared region of the electromagnetic spectrum.

* * * * *